Patented Feb. 17, 1931

1,792,515

UNITED STATES PATENT OFFICE

CHARLES M. A. STINE AND CHARLES E. BURKE, OF WILMINGTON, DELAWARE, ASSIGNORS TO E. I. DU PONT DE NEMOURS & COMPANY, OF WILMINGTON, DELAWARE, A CORPORATION OF DELAWARE

NITRATED ESTERS OF POLYHYDRIC ALCOHOLS

No Drawing. Application filed October 18, 1924, Serial No. 744,468. Renewed March 22, 1929.

This invention relates to new compounds comprising the nitrated esters of lactic acid and polyhydric alcohols, and particularly to esters of this kind in which the alcohol used is glycerine or ethylene glycol.

We have found that when the esters of the polyhydric alcohols and lactic acid are treated with a nitrating acid (a mixture of nitric and sulfuric acids), it is possible to form the neutral nitric esters of these compounds, the nitric acid reacting with the hydroxyl group of the lactic acid radical and also with any free hydroxyl groups in the alcohol radical. For example, in the case of glyceryl monolactate the nitric acid would react with the hydroxyl group in the lactic acid radical and with the two hydroxyl groups in the alcohol radical, giving a dinitro glyceryl nitrolactate of the following composition:

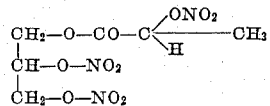

In the case of a glyceryl trinitrolactate we would get a compound of the following composition:

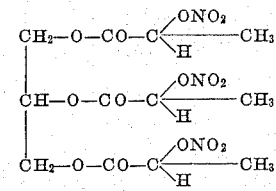

Compounds of this type may normally be prepared as follows: The ester of lactic acid and the polyhydric alcohol is first prepared by any of the methods known and described in the literature. The anhydrous ester is then allowed to run slowly into a well-agitated mixture of nitric acid and sulfuric acid. We have found that a mixed acid containing approximately 50% $HNO_3$ and 50% $H_2SO_4$ gives the best results, but other mixtures may be used. During the reaction the temperature is maintained at approximately 10–15° C., although a somewhat higher temperature is not harmful to the reaction. When all of the ester has been added to the mixed acid, the materials are allowed to separate into two layers, and the upper layer containing the nitrated ester is separated, neutralized and dried.

We have found that nitrated esters prepared in this way are practically insoluble in water, are readily soluble in alcohol and ether and are good colloiding agents for nitrocellulose. They are also more stable to heat and less sensitive to shock than nitroglycerin. While compounds of this type do not have as high an oxygen balance nor as great a nitrogen content as nitroglycerin, they still have sufficient potential to make them useful as constituents in explosives; and since they are more stable and less sensitive than nitroglycerin, they may be used to advantage in many cases as a substitute for nitroglycerin.

By the expression "polyhydric alcohols" as used herein, we do not mean to include hydroxy aldehydes or hydroxy ketones such as the various sugars. In general, the polyhydric alcohols which are used in the present process contain from two to four hydroxyl groups.

To illustrate how the new compounds can be used in the manufacture of propellent explosives the following example is given:

| | Parts |
|---|---|
| Pyro nitrocellulose | 70 |
| Dinitro glyceryl nitrolactate | 30 |
| Diphenylamine | 1 | are mixed and the powder finished by the usual procedure. The explosive so prepared possesses good ballistic properties but is more stable and less sensitive than a corresponding explosive prepared from nitroglycerin.

The new nitrated esters have the following general graphical formula:

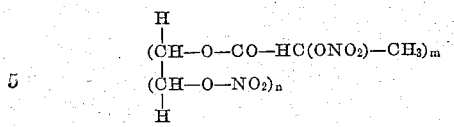

where $m$ stands for the number of methenyl nitrolactate groups, and $n$ for the number of methenyl nitrate groups in the molecule, there being at least one methenyl nitrolactate group in each of the new compounds. These nitrated esters may also be defined as substances whose molecules contain the following atomic grouping:

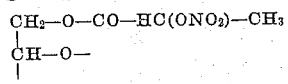

In addition to the specific substances mentioned above, our invention includes various other substances, such, for example, as nitroglyceryl-di-nitrolactate, nitroethylene-glycyl-nitrolactate, ethylene-glycyl-di-nitrolactate, etc., all of which come within the generic expressions set forth above.

Where the term methenyl is used in the description and claims, it is meant to designate the atomic grouping

We claim:
1. A compound comprising a nitrated ester of lactic acid and glycerine.
2. A compound comprising a nitrated ester of lactic acid and a polyhydric alcohol having from two to four hydroxyl groups.
3. A compound comprising a nitrated ester of lactic acid and a polyhydric alcohol having from two to four hydroxyl groups, whose molecules contain the following atomic grouping:

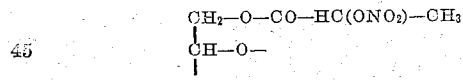

said compound being capable of colloiding nitrocellulose.
4. Nitrated esters having the following general formula:

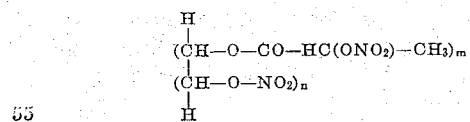

where $m$ stands for the number of methenyl nitrolactate groups, and $n$ stands for the number of methenyl nitrate groups in the molecule, there being at least one and not more than four methenyl nitrolactate groups and not over three methenyl nitrate groups in each of said nitrated esters.
5. Nitrated esters as defined in claim 4 in which $m$ equals 1.
6. Nitrated esters as defined in claim 4 in which $n$ equals 2.
7. Dinitroglyceryl nitrolactate.
8. A compound comprising a nitro-glycyl nitrolactate.
9. Nitrated esters as defined in claim 4 in which $m$ equals 1 or 2.
10. A compound comprising a nitrated ester of lactic acid and a polyhydric alcohol having from 2 to 4 hydroxyl groups and capable of colloiding nitrocellulose.

In testimony whereof we affix our signatures.

CHARLES M. A. STINE.
CHARLES E. BURKE.